United States Patent
Esselborn et al.

(10) Patent No.: US 6,689,731 B2
(45) Date of Patent: Feb. 10, 2004

(54) PHOSPHORIC ESTERS AS EMULSIFIERS AND DISPERSANTS

(75) Inventors: Eberhard Esselborn, Essen (DE); Wernfried Heilen, Alpen (DE); Kathrin Lehmann, Leverkusen (DE); Ellen Reuter, Essen (DE); Stefan Silber, Krefeld (DE); Andreas Stüttgen, Duisburg (DE)

(73) Assignee: Goldschmidt AG, Essen (DE)

( * ) Notice: Subject to any disclaimer, the term of this patent is extended or adjusted under 35 U.S.C. 154(b) by 369 days.

(21) Appl. No.: 09/863,498

(22) Filed: May 23, 2001

(65) Prior Publication Data

US 2002/0011183 A1 Jan. 31, 2002

(30) Foreign Application Priority Data

Jun. 15, 2000 (DE) .......................................... 100 29 648

(51) Int. Cl.$^7$ .............................. C11D 7/36; C11D 3/37
(52) U.S. Cl. .................... 510/288; 510/276; 510/467; 510/469; 510/475; 524/136; 524/115; 524/141
(58) Field of Search ............................... 524/141, 136, 524/115; 510/276, 288, 467, 469, 475

(56) References Cited

U.S. PATENT DOCUMENTS

| | | | |
|---|---|---|---|
| 3,874,891 A | 4/1975 | Grobmann et al. | |
| 4,456,486 A | 6/1984 | Bernhard | |
| 4,698,099 A | 10/1987 | Nakamura et al. | |
| 4,720,514 A | 1/1988 | Needham | |
| 4,872,916 A | 10/1989 | Latosky | |
| 5,130,463 A | 7/1992 | Haubennestel et al. | |
| 5,151,218 A | 9/1992 | Haubennestel et al. | |
| 5,707,422 A | 1/1998 | Jacobsson et al. | |
| 6,310,123 B1 * | 10/2001 | Boinowitz et al. | 524/141 |
| 6,423,130 B2 * | 7/2002 | Boinowitz et al. | 106/476 |

FOREIGN PATENT DOCUMENTS

| | | |
|---|---|---|
| DE | 35 42 441 A1 | 6/1987 |
| DE | 39 30 687 A1 | 4/1991 |
| DE | 198 10 658 A1 | 11/1999 |
| DE | 199 40 797 A1 | 3/2001 |
| EP | 0 256 427 A2 | 8/1987 |
| JP | 59-080320 * | 5/1984 |
| JP | 59-100194 * | 6/1984 |
| JP | 11-246799 | 9/1999 |
| WO | WO 99/46337 | 9/1999 |

OTHER PUBLICATIONS

Mosquet, et al., "Polyoxyethylene Di–Phosphonates as Efficient Dispersing Polymers for Aqueous Suspensions," Journal of Applied Polymer Science, vol. 65, 2545–2555 (1997).

* cited by examiner

*Primary Examiner*—Charles Boyer
(74) *Attorney, Agent, or Firm*—Frommer Lawrence & Haug LLP

(57) ABSTRACT

The invention relates to the use of particular phosphoric esters as emulsifiers and dispersants for pigments and fillers, based on polystyrene-block (b)-polyalkylene oxide copolymers.

The invention provides block copolymeric phosphoric esters and their salts of the general formula (I)

$$[R^1O(SO)_a(EO)_b(CH_2CHCH_3O)_c(BO)_d]_xPO-(OH)_{3-x} \quad (I)$$

where $R_1$ = a straight-chain or branched or cycloaliphatic radical having 1 to 22 carbon atoms, SO = styrene oxide, EO = ethylene oxide, BO = butylene oxide and a = 1 to <2, b = 3 to 100, c = 0 to 10, d = 0 to 3, x = 1 or 2 where $b \geq a+c+d$.

17 Claims, No Drawings

PHOSPHORIC ESTERS AS EMULSIFIERS AND DISPERSANTS

RELATED APPLICATIONS

This application claims priority to German application, 100 29 648.3, filed Jun. 15, 2000, herein incorporated by reference.

BACKGROUND OF THE INVENTION

1. Field of the Invention

The invention relates to the use of particular phosphoric esters as emulsifiers and dispersants for pigments and fillers, based on polystyrene-block (b)-polyalkylene oxide copolymers.

2. Description of the Related Art

The invention relates to the use of particular phosphoric esters as emulsifiers and dispersants for pigments and fillers, based on polystyrene-block (b)-polyalkylene oxide copolymers.

Phosphoric esters and their use as dispersants are known and can be found in the prior art. For instance, U.S. Pat. No. 4,720,514 describes phosphoric esters of a series of alkylphenol ethoxylates which may be used advantageously to formulate aqueous pigment dispersions. Phosphoric esters for a similar application are described by EP-A-0256427. Furthermore, DE-3542441 discloses bisphosphoric monoesters of block copolymers and salts thereof. It also describes their possible use as dispersants and emulsifiers, in particular for preparing crop protection formulations. U.S. Pat. No. 4,872,916 describes the use of phosphoric esters based on alkylene oxides of straight-chain or branched aliphatics as pigment dispersants. Similarly, U.S. Pat. No. 3,874,891 describes the use of corresponding sulfates. The documents U.S. Pat. Nos. 5,130,463 and 5,151,218 report on phosphoric esters based on hydroxy-terminated polyadducts and polycondensation products, respectively, which are used to produce highly filled polyester molding compounds, in particular for SMC and BMC formulations (SMC=sheet molding compounds; BMC=bulk molding compounds). Bifunctional phosphoric esters, prepared by the Mannich-Moedritzer reaction, and their adsorption characteristics on calcium carbonate are described by J. Appl. Polym. Sci. 65, 2545 (1997). U.S. Pat. No. 4,456,486 describes, inter alia, acidic or neutral phosphoric esters of fatty alcohols and alkoxylated fatty alcohols as treatment compositions for certain blue pigments. Similarly, EP-A-256427 describes the use of phosphoric esters of alkoxylated fatty alcohols to prepare pigment dispersions said to be suitable for aqueous applications. U.S. Pat. No. 4,720,514 describes pigment dispersions prepared using phosphoric esters of alkoxylates of differing structure. U.S. Pat. No. 4,698,099 describes pigment dispersions comprising, as dispersants, phosphoric esters of monohydroxy-terminated polyesters.

DE-A-3930687 describes phosphoric esters $(OH)_{3-n}PO—(OR)_n$, and their salts wherein R is an aliphatic, cycloaliphatic and/or aromatic radical which contains at least one ether oxygen atom (—O—) and at least one carboxylic acid grouping (—COO—) and/or urethane group (—NHCOO—), is devoid of Zerewitinov hydrogen, and has an average molecular weight of from 200 to 10000, it being possible for some of the hydrogen atoms of the aliphatic groups to have been replaced by halogen atoms, the ratio of the number of carboxylic ester groups and/or urethane groups in the molecule (or in each group R) is in the range from 1:20 to 20:1, and wherein n is 1 or 2. Also mentioned in particular is the use of these phosphoric esters as dispersants. Polyoxyalkylenecarbonyl monoether phosphates and their use as dispersants are also known from GB-A-19980429.

Also known is the use of such phosphoric esters to prepare emulsion polymers, in which context particular attention is drawn to the ready pigmentability of such emulsion polymers, especially those of low coagulum content (DE-A-19810658, JP-A-1 1246799 and WO 99/46337).

DE-A-19806964 describes particular phosphoric esters based on polystyrene-block (b)-polyalkylene oxide copolymers which are prepared from a monofunctional starter alcohol by sequential addition of styrene oxide and an alkylene oxide. Characteristics of these phosphoric esters include the use of at least 2 mol of styrene oxide for their preparation. Likewise described is the use of these phosphoric esters as dispersants for pigments and fillers. DE-A-19940797 describes the use of nonionic, block copolymeric, polyalkylene oxides containing styrene oxide as low-foam pigment wetting agents, the characteristics of the block copolymers including the use of less than 2 mol of styrene oxide for their preparation.

In the production of paints and inks, wetting agents and dispersants facilitate the incorporation of pigments and fillers, which are important formulating constituents that significantly determine the visual appearance and the physicochemical properties of coatings. Optimum use requires firstly that the solids are distributed uniformly in paints and inks and secondly that the state of distribution, once attained, is stabilized. In many cases, the stabilizing action is also undertaken by binder components. This is especially the case with acidic (styrene) acrylates, as used in particular for preparing printing inks. In these cases, pigment wetting agents are used whose action is to wet the pigment surface very rapidly and so to displace the air from the surface of the pigments by the liquid of the millbase. Especially when using solids having a nonpolar surface in aqueous paints, the wetting must be assisted by wetting agents. This permits favorable development of color strength and thus a near-ideal utilization of the input energy.

In the architectural paint industry in particular, moreover, use is made of aqueous pigment pastes, with or without cosolvents, which are used universally in aqueous emulsion paints on an all-acrylic, styrene acrylic or silicate basis and also in nonpolar decorative coatings based on long-oil alkyd, for tinting.

Particularly suitable for this purpose are the phosphoric esters of alkylphenol ethoxylates or fatty alcohol ethoxylates, which additionally contribute to steric and electrostatic stabilization of dispersed pigment states. The high-performance phosphoric esters of alkylphenol ethoxylates have come under criticism on ecotoxicological grounds, and their use is already regulated by legislators in a number of states. In many cases, the phosphoric esters of fatty alcohol ethoxylates fail to match the good properties of the alkylphenol ethoxylate derivatives. Since they lack adsorptive groups, the pigment wetting properties are less pronounced. Furthermore, the unadsorbed portion of this product group, in particular, has the unwanted effect of stabilizing the foam, which can be suppressed only with the aid of substances with a strong defoaming action which, in turn, bring about other adverse phenomena, such as unwanted surface defects. The use of a large number of dispersing additives also impacts negatively on the water resistance or light stability of coatings.

The known phosphoric esters have the disadvantage, moreover, that they are generally not suitable for universal use, since in many cases there is a lack of sufficient compatibility between dispersing additive and binder or dispersing additive and surrounding medium (aqueous or solvent-borne formulations). Furthermore, the chemical structure of the phosphoric esters has a large part to play: in aqueous formulations it is preferred to use only those phosphoric esters whose molecule does not contain any additional hydrolyzable functional groups, such as ester groups or urethane groups. Frequently, large additions of dispersing additives are necessary in order to suppress the occurrence of agglomerates; the degrees of filling that can be achieved are unsatisfactorily low, the stability of the dispersions and thus the constancy of their viscosity is often inadequate; flocculation and aggregation cannot always be avoided, so that there may be visible separation, leveling defects, and surface defects.

Applications of block copolymers containing styrene oxide in the paints and printing inks industry are still largely unknown. Those which are known include (DE-A-19806964) polystyrene oxide-block (b)-polyalkylene oxide copolymers which, starting from a monofunctional starter alcohol, are reacted to the corresponding phosphoric esters by sequential addition of at least 2 mol of styrene oxide and an alkylene oxide followed by phosphorylation. These block copolymers are likewise used as dispersants.

A disadvantage is the relatively poor biodegradability of these surfactants where the styrene oxide blocks are relatively long. Also of course, the diffusion mobility of dispersing additives of relatively high molecular mass is not particularly high, which is disadvantageous for rapid pigment wetting processes.

It was therefore an object of the present invention to meet the abovementioned requirements, the intention being that a high level of pigment affinity should go hand in hand with a low tendency towards foam stabilization and a high diffusion mobility without adversely affecting other essential coating properties.

SUMMARY OF THE INVENTION

This object is achieved in accordance with the invention, in a first embodiment, by block copolymeric phosphoric esters and their salts of the general formula (I)

$$[R^1O(SO)_a(EO)_b(CH_2CHCH_3O)_c(BO)_d]_xPO\text{---}(OH)_{3-x} \qquad (I)$$

where

R$^1$ a straight-chain or branched or cycloaliphatic radical, preferably having 1 to 22 carbon atoms, SO=styrene oxide, EO=ethylene oxide, BO=butylene oxide and a=1 to <2, preferably to 1.9, b=3 to 100, c=0 to 1, d=0 to 3, x=1 or 2, where b≧a+c+d, in particular by their use as pigment wetting agents for pigment pastes, aqueous, solventborne, low-solvent and solvent-free paints and printing inks. The phosphoric esters of the general formula I are used in particular in an amount of from about 2 to about 200% by weight, based on the weight of the respective pigment.

DETAILED DESCRIPTION OF THE INVENTION

An important factor with respect to the properties of the compounds are the numerical values of the indices a, b, c and d. a indicates the number of styrene oxide groups, which especially in the case of hydrophobic pigment surfaces ensure high adsorption. a here has a value of 1 to <2, in particular to 1.9. b defines the number of ethylene oxide groups, it being possible for b to adopt values from 3 to 100, preferably from 10 to 30. c defines the number of propylene oxide groups and has a value of from 0 to 10, preferably from 1 to 3. d defines the number of butylene oxide groups and has a value from 0 to 3, preferably 0 or 1. The skilled worker is well aware that the compounds are in the form of a mixture having a distribution governed essentially by statistical laws. The alkoxylates to be used in accordance with the invention are mixed alkoxylates. By means of the various alkylene oxide monomers and their fraction in the total polymer it is possible specifically to control the hydrophobic/hydrophilic balance such that any steric requirements of the pigment surface and, in particular, the compatibility in the respective coating system may be tailored accordingly. The alkylene oxide groups may be arranged randomly or in blocks. Particular preference is given to block arrangements containing terminal, preferably hydrophobic groups such as propylene oxide or, in particular, butylene oxide. The molar ratio of the ethylene oxide groups to the other hydrophobic alkylene oxide groups is: b≧a+c+d. It has been found that the structures of the polymers are of critical importance to the advantages achieved in accordance with the invention. Preferably, the respective alkylene oxide groups are present in the stated sequence of the general formula I. However, any other sequences desired are also included in the description.

Of similar significance are the structures of the straight-chain or branched or cycloaliphatic radicals R$^1$, by which the space occupancy of these surfactants at interfaces can be controlled. For many applications, branched aliphatic radicals R$^1$ are advantageous, for the purpose of suppressing foam. Particular preference is therefore given to branched C$_9$ alcohols as starting agents for the alkoxylation. Particular preference is given to 3,5,5-trimethylhexan-1-yl and 2,6-dimethylheptan-4-yl radicals; the skilled worker is well aware that the parent alcohols are in the form, in particular, of isomeric mixtures, the particular isomer mixture being heavily dependent on the respective process conditions.

The preparation of the hydroxy-functional, block copolymeric polyalkylene oxides containing styrene oxide, which are starting materials for the phosphoric esters to be used in accordance with the invention, has already been described in principle in DE-A-19940797.

Conversion into the phosphoric esters to be used in accordance with the invention takes place by reacting the terminal hydroxyl groups with a phosphorus compound which forms phosphoric esters, in a manner corresponding to the prior art. Suitable phosphorus compounds are, for example, phosphorus pentoxide, phosphoryl chloride or polyphosphoric acids of the general formula H$_{n+2}$P$_n$O$_{3n+1}$. To prepare the phosphoric esters, particular preference is given to using a commercially available polyphosphoric acid having a P$_4$O$_{10}$ content of approximately 85% by weight. The reaction generally takes place without solvents at temperatures from about 60 to 120° C., in particular at temperatures from 80 to 100° C. To remove any traces of moisture present it is possible first to remove residues of water from the system using an inert solvent, such as toluene or xylene, for example, before the reaction with the polyphosphoric acid. In principle, however, the reaction may also take place in the presence of solvents or solvent mixtures.

The terminal hydroxyl groups, intended for esterification, in the amphiphilic block copolymers is esterified preferably to a level of from 50 to 100%, with particular preference quantitatively, in the esterification reaction. Depending on the amount that is used of the phosphorus compound which forms phosphoric esters, based on the hydroxy equivalent of the block copolymers, the products are alternatively preferentially monoesters, diesters, or mixtures of monoesters and diesters.

Depending on the pH of the medium in which they are employed, the phosphoric esters for use in accordance with the invention may also be in partially or fully neutralized form. In this case, as the counterions, mention may be made in particular of alkali metal and alkaline earth metal ions and also substituted or unsubstituted ammonium ions.

Examples of phosphoric esters for use in accordance with the invention are:

a) $((3,5,5\text{-trimethyl-1-hexanol})(SO)_1(EO)_5)_1PO(OH)_2$
b) $((3,5,5\text{-trimethyl-1-hexanol})(SO)_1(EO)_9)_1PO(OH)_2$
c) $((1\text{-nonanol})(SO)_1(EO)_9)_1PO(OH)_2$
d) $((2,6\text{-dimethyl-4-heptanol})(SO)_1(EO)_9(BO)_3)_1PO(OH)_2$
e) $((3,5,5\text{-trimethyl-1-hexanol})(SO)_{1.9}(EO)_{12})_1PO(OH)_2$
f) $((1\text{-nonanol})(SO)_1(EO)_9(CH_2CHCH_3)_3)_1PO(OH)_2$ Aqueous pigment pastes are prepared using from about 2.0 to about 200% by weight of the phosphoric esters for use in accordance with the invention, preferably from about 5.0 to about 100% by weight (based on the weight of the pigments). When used in accordance with the invention, alone or in combination, the phosphoric esters may be either mixed beforehand with the pigments to be dispersed or dissolved directly in the aqueous or solvent-containing dispersing medium, prior to or simultaneously with the addition of the pigments and any solids. Occasionally it is also preferred to apply the phosphoric esters—by spraying, for example—to the solids that are to be dispersed, prior to the dispersing process.

The skilled worker is well aware that the phosphoric esters can of course also be combined with other, conventional pigment-wetting additives and resins.

The invention further relates to the use of the pigment preparations according to the invention to pigment natural or synthetic materials. They are particularly suitable for tinting nonpolar decorative paints based on long-oil alkyds, but also for preparing emulsion paints, aqueous flexographic and gravure inks, wallpaper inks, aqueous wood preservative systems and aqueous wood stains, plasters, and also to pigment colored pencil leads, fibertip pens, inkjet inks, drawing inks, and ballpoint pen pastes.

Examples of pigments that may be used in this context are organic and inorganic pigments and also carbon blacks.

As inorganic pigments, mention may be made by way of example of titanium dioxides and iron oxides. Examples of organic pigments for consideration are azo pigments, metal complex pigments, anthraquinonoid pigments, phthalocyanine pigments, polycyclic pigments, especially those of the thioindigo, quinacridone, dioxazine, pyrrolopyrrole, naphthalenetetracarboxylic acid, perylene, isoamidolin(on)e, flavanthrone, pyranthrone or isoviolanthrone series. With particular preference, the dispersing additives for use in accordance with the invention are suitable for preparing aqueous carbon black pastes.

Examples of fillers which may be dispersed, for example, in aqueous paints are those based on kaolin, talc, other silicates, chalk, glass fibers, glass beads or metal powders.

Suitable coating systems into which the pigment pastes prepared in accordance with the invention may be incorporated include any desired one-component (1K) or two-component (2K) coatings, and also nonpolar low-solvent or solvent-free coating systems. Examples that may be mentioned include aqueous 1K coating materials, such as those based on alkyd, acrylic, epoxy, polyvinyl acetate, polyester or polyurethane resins, or aqueous 2K coating materials, examples being those based on hydroxyl-containing polyacrylate resins or polyester resins with melamine resins or optionally blocked polyisocyanate resins as crosslinkers. Similarly, mention may also be made of polyepoxide systems. As low-solvent coating materials, particular mentioned may be made of those based on long-oil alkyds.

Moreover, these highly effective anionic surfactants are highly effective emulsifiers and as such are ideally suited, for example, to the preparation of low-coagulum emulsion polymers characterized by high pigment acceptance. In this case too, the phosphoric esters for use in accordance with the invention may be used alone or in combination.

Analogously, the polyalkylene oxides which serve as precursors for the synthesis of the phosphate esters may also be used, in accordance with prior art processes using known sulfating and sulfonating reagents, to prepare new kinds of sulfate esters and sulfonate esters. Compounds of this kind containing styrene oxide as alkylene oxide monomer have not been disclosed to date. It is assumed that these novel compounds may be used in the same way as the phosphate esters described here for dispersing pigments or stabilizing emulsions.

In the examples which follow, the preparation of the compounds for use in accordance with the invention is described first of all. This is followed by performance examples to demonstrate the properties of the compounds of the invention and, for comparison therewith, properties achievable with known products of the prior art.

The skilled worker will understand and be well aware that these examples represent only a selection of the possibilities that exist, and are by no means to be regarded as a restriction.

Implementation Examples

Preparation Examples

Synthesis of Polyalkylene Oxide A1V 3364 g (23.4 mol) of trimethylhexanol and 163 g (2.3 mol) of potassium methoxide were introduced into a reactor. Following careful flushing with ultrapure nitrogen, they were heated to 110° C. and 3082 g (25.4 mol) of styrene oxide were added over the course of one hour. After a further two hours, the addition reaction of the styrene oxide had ended, as was evident from a residual styrene oxide content of <0.1% by weight according to GC. Thereafter, 3392 g (77.1 mol) of ethylene oxide were metered into the reactor at a rate such that the internal temperature did not exceed 120° C. and the pressure did not exceed 6 bar. Following complete introduction of the ethylene oxide, the temperature was held at 115° C. until a constant manometer pressure indicated the end of the afterreaction. Finally, at 80 to 90° C., the unreacted residual monomers were removed in vacuo. The product obtained was neutralized using phosphoric acid, the water was removed by distillation, and the potassium phosphate formed was removed by filtration together with a filter aid.

The molecular mass from the determination of the hydroxyl number, assuming a functionality of 1, was M=467 g/mol.

Analogously, compounds A2V to A6V were contrasted with the compound A7V in accordance with processes corresponding to the prior art:

| Compound | $R^1$ | a | b | c | d | M |
|---|---|---|---|---|---|---|
| A1V | 3,5,5-Trimethylhexanyl | 1 | 5 | 0 | 0 | 467 |
| A2V | 3,5,5-Trimethylhexanyl | 1 | 9 | 0 | 0 | 630 |
| A3V | 1-Nonanyl | 1 | 9 | 0 | 0 | 635 |
| A4V | 2,6-Dimethyl-4-heptanyl | 1 | 9 | 0 | 3 | 845 |
| A5V | 3,5,5-Trimethylhexanyl | 1.9 | 12 | 0 | 0 | 850 |
| A6V | 1-Nonanyl | 1 | 9 | 3 | 0 | 810 |
| A7V | 3,5,5-Trimethylhexanyl | 2.1 | 9 | 0 | 0 | 75 |

Synthesis of the Phosphoric Esters: A1–A6 and A7 x g (corresponding to 1 OH equivalent) of the block copolymer was charged to the reactor and following the addition of about 50 ml of toluene was heated to 110° C. By applying a vacuum, all of the volatile fractions, especially any water present in the product, were removed from the reaction space by distillation. After establishing a nitrogen atmosphere, the temperature was set at 80° C. and 85 g of the liquid polyphosphoric acid (0.25 mol $P_4O_{10}$; manufacturer: Merck; purity calculated as $P_4O_{10}$: approximately 85%) were added. After 2 hours, the reaction is at an end. Aliphatic hydroxyl group is no longer detectable in the $^1$H-NMR spectrum.

Analogously, the compounds A1 to A6 and A7 were prepared in accordance with processes corresponding to the prior art.

To prepare an aqueous solution, the 100% product was neutralized using dilute potassium hydroxide solution with a concentration of 10% by weight, neutralization being accompanied by intensive cooling. For performance investigations described below, the solutions were each adjusted to a solids content of 35%.

As comparative examples, use was made of a fatty acid ethoxylate B1 (Tego® Dispers 740W, Tego), a nonylphenol ethoxylate containing 9 mol of ethylene oxide B2 (Berol®09Akzo), a corresponding monophosphate derivative B3 (Berol®733, Akzo), and an oleyl alcohol B4 ethoxylated with 10 mol of EO (Alkanol O10, Tego).

Performance Examples

To examine the efficiency of the phosphoric esters for use in accordance with the invention as dispersing additives, and also the comparative compounds, the following procedure was adopted: Preparation of the pigment pastes:

To prepare the pigment pastes, the respective additives were mixed with water and, if desired, antifoams and subsequently the pigments were added. Dispersion was carried out following the addition of grinding media (glass beads 2–3 mm, same volume as the pigment paste) for one (inorganic pigments) or two (organic pigments and carbon black) hours in a Skandex shaker with air cooling.

Formulation of the Blue Pastes

The blue pastes were formulated as follows (amounts in % by weight):

45.9 water 12.2 phosphoric ester additive (based on 100% solids)

1.0 defoamer (Tego® Foamex 830, Tego Chemie Service GmbH)

40.8 dye (Heliogenblau 7080, BASF)

0.1 preservative (Bodoxin® AH, Bode-Chemie)

Formulation of the Black Pastes

The black pastes were formulated as follows (amounts in % by weight):

56.9 water 15.0 phosphoric ester additive (based on 100% solids)

1.0 defoamer (Tego® Foamex 830, Tego Chemie Service GmbH)

0.1 preservative (Bodoxin® AH, Bode-Chemie)

27.0 pigment (Lamp black 101, Degussa)

Formulation of the Red Iron Oxide Pastes 25.8 water 8.1 phosphoric ester additive (based on 100% solids)

0.1 preservative (Bodoxin® AH, Bode-Chemie)

1.0 defoamer (Tego® Foamex 830, Tego Chemie Service GmbH)

65.0 red iron oxide (Bayferrox® 140M, Bayer)

Because of the reduced foam stabilization in these cases, it was possible to prepare pigment pastes of the invention with a lower defoamer concentration (0.8 instead of 1.0%).

Test Paints

Two commercially available white paints based on straight acrylic dispersions (Mowilith® DM771) and based on a solvent-free long-oil alkyd (Alkydal® F681, 75% strength) were used.

White Paint 1 (Aqueous)

| | |
|---|---|
| Water | 3.8 |
| Additol ® XW330 | 0.3 (wetting agent, Vianova) |
| 2% strength aqueous of Tylose ® MH2000 K | 9.4 (thickener, Clariant) |
| 10% aqueous solution of Calgon ® N | 1.1 (wetting agent, Henkel) |
| Foamex ® 8030 | 0.4 (defoamer, Tego ® Chemie Service) |
| Kronos ® 2190 | 22.6 (titanium dioxide, Kronos) |
| Omyacarb ® 5 GU | 16.8 (filler, Omya) |
| Micro Talc AT1 | 3.8 |
| China Clay B | 2.0 |
| Mergal ® K10N | 0.2 (preservative, Allied Signal) |
| Mowilith ® DM771 | 37.5 (straight acrylic dispersion, Clariant) |
| Ammonia (25% strength) | 0.2 |
| White spirit | 1.1 |
| Butyldiglycol acetate | 0.8 |

White Paint 2 (Solvent-based)

| | |
|---|---|
| Alkydal ® F681, 75% strength | 50.0 (long-oil alkyd, Bayer) |
| Bayertitan ® R-KB-2 | 26.0 (titanium dioxide, Kerr McGee) |
| Octa Soligen ® Ca. 4 | 2.0 (dryer, Borchers) |
| Bentone 34, 10% strength | 1.4 (10 parts Bentone 34, dispersion 10 parts Tego ® Dispers 700, 80 parts white spirit) |
| K60 | 18.0 (crystal oil) |
| Octa Soligen ® cobalt 6 | 0.3 (Borchers) |
| Octa Soligen ® zirconium | 182.0 (Borchers) |
| Ascinin ® R concentrated | 0.3 (Byk) |

To prepare tinted paints, color paste and white paint were mixed manually in a proportion of 1 g of color pigment to 25 g of white pigment.

Test of the Paste Stabilities

To determine the paste stabilities, the achievable initial viscosities and the viscosities following four weeks' storage at 50° C. were determined at two different shear rates (20 1/s and 1000 1/s).

Blue Pastes

| Sample | Viscosity/Pas immediate at 20 1/s | Viscosity/Pas immediate at 1000 1/s | Viscosity/Pas after 4 weeks at 50° C. at 20 1/s | Viscosity/Pas after 4 weeks at 50° C. at 1000 1/s |
|---|---|---|---|---|
| A1 | 1300 | 150 | 1500 | 203 |
| A2 | 1150 | 130 | 1300 | 155 |
| A3 | 1200 | 134 | 1380 | 160 |
| A4 | 1100 | 120 | 1320 | 140 |
| A5 | 1200 | 125 | 1360 | 138 |
| A6 | 1170 | 140 | 1290 | 160 |
| A7 | 1400 | 200 | 1800 | 250 |
| B1 | 1100 | 150 | 1700 | 235 |
| B2 | 1700 | 130 | 2500 | 280 |
| B3 | 1100 | 130 | 190 | 190 |
| B4 | 2000 | 250 | 4000 | 390 |

Black Pastes

| Sample | Viscosity/Pas immediate at 20 l/s | Viscosity/Pas immediate at 1000 l/s | Viscosity/Pas after 4 weeks at 50° C. at 20 l/s | Viscosity/Pas after 4 weeks at 50° C. at 1000 l/s |
|---|---|---|---|---|
| A1 | 400 | 120 | 420 | 140 |
| A2 | 360 | 100 | 380 | 130 |
| A3 | 365 | 110 | 380 | 120 |
| A4 | 350 | 100 | 345 | 120 |
| A5 | 310 | 108 | 340 | 93 |
| A6 | 405 | 120 | 420 | 140 |
| A7 | 400 | 130 | 500 | 200 |
| B1 | 400 | 130 | 500 | 180 |
| B2 | 500 | 120 | no stability | |
| B3 | 420 | 130 | 700 | 182 |
| B4 | paste not preparable | | | |

Red Iron Oxide Pastes

| Sample | Viscosity/Pas immediate at 20 l/s | Viscosity/Pas immediate at 1000 l/s | Viscosity/Pas after 4 weeks at 50° C. at 20 l/s | Viscosity/Pas after 4 weeks at 50° C. at 1000 l/s |
|---|---|---|---|---|
| A1 | 790 | 320 | 1000 | 395 |
| A2 | 650 | 395 | 900 | 425 |
| A3 | 630 | 320 | 870 | 370 |
| A4 | 615 | 290 | 820 | 320 |
| A5 | 700 | 408 | 900 | 440 |
| A6 | 720 | 326 | 890 | 370 |
| A7 | 1100 | 500 | 1700 | 1000 |
| B1 | 800 | 500 | 1010 | 700 |
| B2 | 1300 | 450 | no stability | |
| B3 | 1800 | 900 | 4000 | 1300 |
| B4 | 900 | 160 | no stability | |

The good stability of the pigment pastes of the invention for all types of pigment investigated was readily evident from the small increase in viscosity in each case, whereas the comparative examples only sporadically permitted the preparation of stable pigment preparations.

Test of the Dispersing Properties

Drawdown of the test formulations with 200 pm wet film thickness; after 5 minutes' drying, rubout test on ⅓ of the surface. Colorimetric measurement of the drawdowns using an XP 68 spectrophotometer from X-Rite.

Dispersion Paint Based on Mowilith® DM771/blue

| Sample | Colorimetric values L and b | | Delta E after rubout |
|---|---|---|---|
| A1 | 65.5 | −31.6 | 2.2 |
| A2 | 65.2 | −32.1 | 2.4 |
| A3 | 64.7 | −32.3 | 1.9 |
| A4 | 65.0 | −32.0 | 2.0 |
| A5 | 64.6 | −32.5 | 1.8 |
| A6 | 65.3 | −31.9 | 1.9 |
| A7 | 65.4 | −31.0 | 3.5 |
| B1 | 63.7 | −33.9 | 0.9 |
| B2 | 65.6 | −30.6 | 4.3 |
| B3 | 65.2 | −32.0 | 3.9 |
| B4 | 63.9 | −31.5 | 5.7 |

Dispersion Paint Based on Mowilith® DM771/red

| Sample | Colorimetric values L, a and b | | | Delta E after rubout |
|---|---|---|---|---|
| A1 | 75.8 | 13.3 | 4.5 | 0.4 |
| A2 | 75.9 | 13.1 | 4.3 | 0.4 |
| A3 | 75.8 | 13.4 | 4.2 | 0.5 |
| A4 | 75.5 | 13.6 | 4.5 | 0.3 |
| A5 | 75.6 | 13.5 | 4.6 | 0.4 |
| A6 | 75.7 | 13.4 | 4.5 | 0.3 |
| A7 | 74.8 | 13.2 | 4.0 | 1.3 |
| B1 | 75.0 | 13.0 | 4.1 | 0.9 |
| B2 | 74.9 | 13.1 | 4.1 | 1.2 |
| B3 | 75.5 | 13.2 | 4.2 | 0.7 |
| B4 | 75.2 | 12.9 | 4.7 | 0.9 |

Dispersion Paint Based on Mowilith® DM771/gray

| Sample | Colorimetric values L and b | | Delta E after rubout |
|---|---|---|---|
| A1 | 60.3 | 4.5 | 0.3 |
| A2 | 60.4 | 4.4 | 0.2 |
| A3 | 60.4 | 4.4 | 0.3 |
| A4 | 60.6 | 4.5 | 0.2 |
| A5 | 60.5 | 4.3 | 0.3 |
| A6 | 60.2 | 4.4 | 0.1 |
| A7 | 61.1 | 4.4 | 1.4 |
| B1 | 59.1 | 4.3 | 0.5 |
| B2 | 61.8 | 4.3 | 1.2 |
| B3 | 62.6 | 4.3 | 2.4 |
| B4 | no result | | no result |

Alkyd Paint Based on Alkydal® F681/blue

| Sample | Colorimetric values L and b | | Delta E after rubout |
|---|---|---|---|
| A1 | 68.0 | −29.9 | 1.5 |
| A2 | 68.2 | −29.7 | 1.7 |
| A3 | 66.7 | −30.8 | 1.6 |
| A4 | 67.3 | −29.9 | 1.4 |
| A5 | 68.0 | −29.5 | 1.7 |
| A6 | 67.8 | −30.1 | 1.6 |
| A7 | 66.5 | −28.7 | 3.3 |
| B1 | 88.0 | −4.0 | 24.7 |
| B2 | 67.7 | −29.2 | 4.2 |
| B3 | 68.8 | −28.4 | 4.1 |
| B4 | 66.3 | −28.6 | 3.1 |

Alkyd Paint Based on Alkydal® F681/red

| Sample | Colorimetric values L, a and b | | | Delta E after rubout |
|---|---|---|---|---|
| A1 | 76.8 | +12.3 | +2.7 | 0.4 |
| A2 | 76.6 | +12.0 | +2.6 | 0.3 |
| A3 | 77.0 | +12.1 | +2.8 | 0.4 |
| A4 | 77.5 | +12.2 | +2.7 | 0.2 |
| A5 | 77.2 | +11.9 | +2.6 | 0.6 |
| A6 | 76.9 | +11.9 | +2.7 | 0.3 |
| A7 | 78.1 | +7.9 | +1.8 | 3.9 |
| B1 | 79.0 | +8.9 | +0.9 | 2.7 |
| B2 | 87.2 | +2.4 | +0.1 | 11.5 |
| B3 | 79.7 | +9.0 | +1.3 | 4.8 |
| B4 | 78.0 | +7.3 | +1.5 | 5.0 |

Alkyd Paint Based on Alkydal F68 1/gray

| Sample | Colorimetric values L and b | | Delta E after rubout |
|---|---|---|---|
| A1 | 62.1 | 6.0 | 0.4 |
| A2 | 61.7 | 5.9 | 0.3 |
| A3 | 61.9 | 6.5 | 0.6 |
| A4 | 62.3 | 6.3 | 0.5 |
| A5 | 62.7 | 6.4 | 0.3 |
| A6 | 62.4 | 6.2 | 0.5 |
| A7 | 62.9 | 6.3 | 1.0 |
| B1 | 80.7 | 4.2 | 8.7 |
| B2 | 63.1 | 6.6 | 1.2 |
| B3 | 63.1 | 6.5 | 1.8 |
| B4 | no result | | no result |

In evidence were the favorable development of color strength which could be achieved and also the rubout test which was favorable in all cases owing to the dispersing additives of the invention.

This was also the case in particular, markedly so, in comparison to the comparative examples, which only sporadically gave good developments of color strength. Particularly marked was the superiority of the phosphoric esters for use in accordance with the invention, on the basis of the excellent delta E rubout values for all types of pigment in both water-based and solvent-based systems.

Another feature deserving of particular emphasis is the markedly improved redispersibility of portions of preparation which have dried up or started to dry. Moreover, they possess a very low tendency to start to dry up or to dry out. Viscosity, rheology, and the necessary prerequisites for excellent metering possibilities are markedly improved as a result.

The pigment preparations according to the invention possess a very high color strength and brightness. It is possible to achieve high pigment concentrations. The pigment concentrates were preparable without great grinding effort; both of these factors are associated with large economic advantages.

Use example for the preparation of emulsion polymers

The emulsifier A2 was dissolved in water and adjusted to a pH of 9 using ammonia.

| Initial charge: | 1.5 g | emulsifier A2 |
|---|---|---|
| | 250 g | water |
| | 36 g | portion of feed stream 1 |
| | 5 g | portion of feed stream 2 |
| Feed stream 1: | 8.5 g | emulsifier A2 |
| | 200 g | water |
| | 15 | gacrylamide (50% strength in water) |
| | 12.5 g | acrylic acid |
| | 242 g | styrene |
| | 237 g | n-butyl acrylate |
| Feed stream 2: | 2.5 g | Na peroxodisulfate |
| | 98 g | water |

The initial charge in a polymerization vessel equipped with an anchor stirrer, reflux condenser and 2 feed vessels was heated under a nitrogen atmosphere to a temperature of 85° C. and polymerized for 15 minutes. Then feed stream 1 was metered in over 2 hours and feed stream 2 over 2¼ hours. This was followed by postpolymerization for 1 hour. The product was then filtered through a sieve of mesh size 500 μm and the coagulum fraction in the wet state was found by weighing to be <0.1%. The solids content of the dispersion was 48% at a viscosity of 130 mPas.

The use of these phosphate esters for emulsion polymerization is especially advantageous when the binders are used to formulate paints, since these emulsifiers permit high pigment concentrations in the dispersion and the pigment binding power of the polymer is therefore large, which again—as the skilled worker is well aware—leads to higher wet abrasion resistances.

The above description is intended to be illustrative and not limiting. Various changes and modifications in the embodiment described herein may occur to those skilled in the art. Those changes can be made without departing from the scope and spirit of the invention.

What is claimed is:

1. A block-copolymer phosphoric ester or salt thereof of the general formula

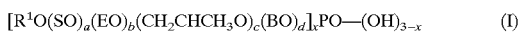

$$[R^1O(SO)_a(EO)_b(CH_2CHCH_3O)_c(BO)_d]_xPO\text{—}(OH)_{3-x} \quad (I)$$

where $R^1$ = a straight-chain or branched or cycloaliphatic radical, so = styrene oxide, EO = ethylene oxide, BO = butylene oxide and a = 1 to <2, b = 3 to 100, c = 0 to 10, d = 0 to 3, x = 1 or 2 where $b \geq a+c+d$.

2. The block copolymer as claimed in claim 1, wherein $R^1$ is a straight-chain or branched or cycloaliphatic radical having 1 to 22 carbon atoms.

3. The block copolymer as claimed in claim 1, wherein the polyalkylene oxide blocks are arranged in blocks.

4. The block copolymer as claimed claim 1, wherein $R^1$ is a straight-chain or branched or cycloaliphatic radical having 8 to 13 carbon atoms.

5. The block copolymer as claimed in claim 1, wherein $R^1$ is a branched aliphatic radical having 9 to 13 carbon atoms.

6. The block copolymer as claimed in claim 1, wherein $R^1$ is selected from the group consisting of isononanyl, 3,5,5-trimethylhexanyl and 2,6-dimethylheptan-4-yl.

7. The block copolymer as claimed in claim 1, wherein a=1 to 1.9.

8. The block copolymer as claimed in claim 1, wherein c=1 to 10.

9. The block copolymer as claimed in claim 1, wherein d=1 to 3.

10. The block copolymer as claimed in claim 1, wherein x=1 for at least 80% of the molecules.

11. A pigment paste, ink or paint which comprises a block copolymer according to claim 1 and a pigment.

12. A method for stabilizing an o/w and w/o emulsions which comprises adding a block copolymer phosphoric ester or its salt as claimed in claim 1 to said emulsion.

13. An emulsion stabilizer which comprises a block copolymer phosphoric acid salt or its salt as claimed in claim 1.

14. A laundry detergent or a cleaning product which comprises a block copolymer phosphoric acid ester or its salt as claimed in claim 1 as a surfactant.

15. A pigment wetting agent which comprises a block copolymer phosphoric acid ester or its salt as claimed in claim 1.

16. A printing ink or paint which comprises a pigment wetting agent according to claim 15 wherein said ink or paint is aqueous, solvent borne, low-solvent or solvent-free ink or paint.

17. The painting ink or paint according to claim 16, which comprises at least about 2% of a block copolymer, based on the amount of pigment; and no more than about 200% of a block copolymer, based on the amount of pigment.

* * * * *